United States Patent [19]

Kakuta et al.

[11] 4,209,119

[45] Jun. 24, 1980

[54] TAPE DRIVE CONTROL APPARATUS

[75] Inventors: Susumu Kakuta; Katsuyoshi Nukui; Kenji Hiraishi, all of Mitaka, Japan

[73] Assignee: Nippon Columbia Kabushikikaisha, Tokyo, Japan

[21] Appl. No.: 914,689

[22] Filed: Jun. 12, 1978

[30] Foreign Application Priority Data

Jun. 21, 1977 [JP] Japan .................................. 52/73666

[51] Int. Cl.² ...................... B65H 25/24; B65H 23/16
[52] U.S. Cl. ........................................ 226/24; 226/10; 226/35
[58] Field of Search ........................ 226/10, 24, 33, 34, 226/35, 38, 39, 41, 42; 242/186, 206

[56] References Cited

U.S. PATENT DOCUMENTS

| | | | |
|---|---|---|---|
| 2,952,415 | 9/1960 | Gilson | 226/42 |
| 3,236,428 | 2/1966 | Yomane | 226/24 |
| 3,294,331 | 12/1966 | Wong | 226/24 X |
| 3,561,700 | 2/1971 | Adams | 226/35 |

Primary Examiner—Edward J. McCarthy

[57] ABSTRACT

A tape drive control apparatus in which a tape is wound on a capstan rotating at a constant speed and driven by the friction between the capstan and the tape without using a pinch roller. The tape is moved apart from the capstan upon the fast mode such as the fast forward or rewinding mode and upon the stop mode.

9 Claims, 7 Drawing Figures

TAPE DRIVE CONTROL APPARATUS

BACKGROUND OF THE INVENTION

1. Field of the Invention

The present invention relates to a tape drive control apparatus for use with a data recorder, tape recorder and so on, and is directed more particularly to a tape drive control apparatus for use with a tape recorder and so on in which a pinch roller is not used by which a tape is moved apart from the capstan upon the high speed tape transportation mode and stop mode of the tape.

2. Description of the Prior Art

In a prior art tape drive control apparatus for use with a tape recorder shown in FIG. 1, a tape 2 wound on a supply reel 1 passes through a guide post 3, a guide roller 4 and so on, then contacts with a magnetic head group 5, is wound on a capstan 6 with an angle θ (which is generally greater than 90°), passes a guide post 7, and then is taken up by a take-up reel 8. In some examples, both the guide posts 3 and 7 are mounted on a tension servo arm (not shown) so as to keep the tension of the tape 2 constant.

Upon the recording or reproducing mode, the tape 2 is wound sufficiently on the capstan 6 which is rotated at constant speed by a capstan motor (not shown). Thus, the tape 2 is transported at a constant speed, without slipping by the friction force which is determined by the urging force defined by the winding angle θ of the tape 2 on the capstan 6 and the tape tension and the frictional factor on the contacting surface of the tape 2 with the capstan. Accordingly, with the prior art apparatus shown in FIG. 1, no abrasion is caused on the tape 2 and no abnormal tension is caused in the tape 2. This is different from the case where a pinch roller is used to urge the tape against the capstan.

However, with the prior art apparatus shown in FIG. 1, when its operation mode is changed to the fast forward mode or stop mode, the rotational speed of the capstan 6 is varied. Therefore, if the inertial mass of the capstan system as selected is large, the acceleration characteristics thereof deteriorates and the time interval, within which the capstan 6 arrives at a normal rotational speed, becomes long. On the contrary, if the inertial mass of the capstan system as selected is small, its mechanical impedance becomes small and hence the capstan system is reduced in stability and is responsive fluctuation caused by external loads with the result that the value of wow and flutter deteriorates. Therefore, the prior art apparatus can not be used, as it is, in a tape recorder for audio use which requires severe acceleration characteristics or wow and flutter value.

OBJECTS AND SUMMARY OF THE INVENTION

Accordingly, an object of the present invention is to provide an improved tape drive control apparatus which will keep the feature of the prior art tape drive control apparatus using no pinch roller and can remove the defects on the acceleration characteristics and wow and flutter value inherent to the prior art.

Another object of the invention is to provide a tape drive control apparatus provided with a device which can make a tape move apart from a capstan by a shaft movable around the capstan when the tape is driven at high speed.

A further object of the invention is to provide a tape drive control apparatus having a device which can make a tape move apart from a capstan by a shaft movable around the capstan upon the tape being stopped.

According to an aspect of the present invention there is provided a tape drive control apparatus in which, in order to remove the defects inherent to the prior art, the inertial mass i.e. mechanical impedance of its capstan system is held sufficiently large, so as to a predetermined value of wow and flutter, and such a tape shift mechanism is provided such that a tape is made to move into contact with a capstan rotating at constant speed upon only recording and reproducing, while upon tape fast forward or tape stop mode the tape is made to move out at contact with or apart from the capstan.

The other objects, features and advantages of the present invention will become apparent from the following description taken in conjunction with the accompanying drawings.

DESCRIPTION OF THE PREFERRED EMBODIMENTS

The present invention will be described hereinafter with reference to the accompanying drawings.

Figure 1:
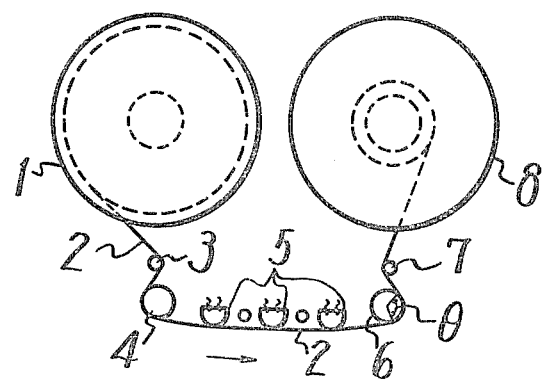
FIG. 1 is a schematic diagram showing a prior art tape drive control apparatus.
Figure 2:
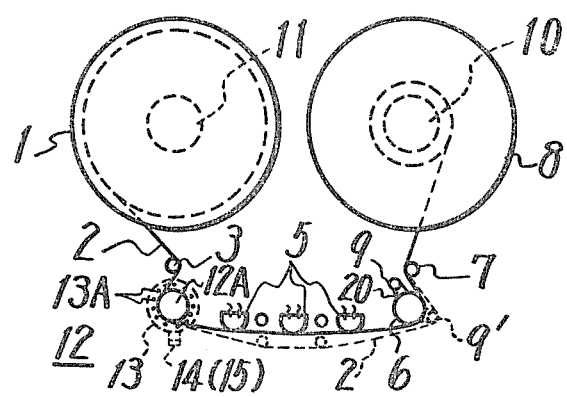
FIG. 2 is a schematic diagram showing an example of the tape drive control apparatus according to the present invention.

FIG. 2 is a schematic diagram showing the whole of a data recorder in which an example of the present invention is employed. In FIG. 2, reference numerals same as those used in FIG. 1 designate the same elements and hence their detailed description will be omitted for the sake of brevity.

In the example of the invention shown in FIG. 2, in association with the tape transportation path or capstan 6, there are provided a tape shift post 9 such that it can be revolved about the axis of the capstan 6 and a tape speed detecting device 12 in place of the roller 4 used in the prior art apparatus shown in FIG. 1, which are the main difference between the present invention and the prior art shown in FIG. 1. In this case, the tape tension is held constant by the well-known manner such as the reel rotation speed detecting and so on.

With the present invention, during recording and reproducing modes the tape shift post 9 is located at the position shown in FIG. 2 by the solid line, so that the tape 2 is in contact with the capstan 6 and hence driven at a constant speed.

While, during the fast forward, rewind and stop modes the tape shift post 9 is revolved about the capstan 6 to be located at a position 9' shown in FIG. 2 by the dotted line to move the tape 2 apart from the capstan 6 in contact with the tape 2 as shown by the dotted line in FIG. 2. As a result, even if the capstan 6 is rotated at the constant speed, the tape 2 is not abraded any by the capstan 6 since the tape 2 is not in contact with the rotating capstan 6. Thus, the mode change can be carried out smoothly. In this case, as shown in FIG. 2 by the dotted line, the tape 2 is of course made apart from the magnetic head group 5 by the well-known device.

Next, a description will be now given on the operation of the tape shift post 9. When the tape 2 is in stop mode or is not driven, the tape shift post 9 is positioned at 9' as indicated by the dotted line as described previously. When the mode is changed from the stop mode to the recording or reproducing mode, the tape shift post 9 is moved from the position 9' to the position 9 indicated by the solid line and hence the tape shift post 9 is moved to part from the tape 2. Thus, the tape 2 contacts with the capstan 6, which rotates at the constant speed, and the tape 2 is accelerated up to the normal speed by the friction between the tape 2 and the capstan 6. In this case, however, during the acceleration period of the tape speed there is a difference between the tape speed and the capstan speed, so that both the capstan 6 and tape 2 are abraded. In order to avoid the abrasion of the tape 2 and the capstan 6 during the rising-up period of the tape 2, with the example of the invention shown in FIG. 2, upon changing of the mode to the recording or reproducing mode, the tape 2 is firstly driven by reel motors 10 and 11 to its normal speed, the fact that the tape 2 arrives at its normal speed is detected by the tape speed detecting device 12, and then the tape post shift 9 is moved from its position 9' to position 9 to make the tape 2 contact with the capstan 6.

Figure 3:
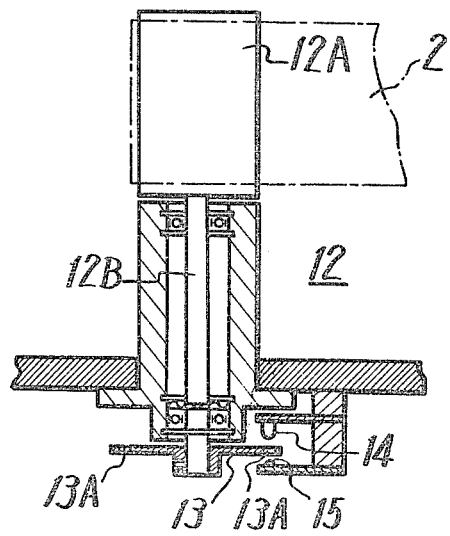
FIG. 3 is a schematic cross sectional view showing an example of the tape speed detecting device used in the example shown in FIG. 2.

The tape speed detecting device 12 will be now described with reference to FIG. 3 which is its cross-sectional view. This tape speed detecting device 12 is a well-known photo-electric rotation detecting device which consists of a roller 12A which contacts with the tape 2 to be rotated therewith, a disc 13 attached to one end portion of a rotary shaft 12B of the roller 12 and provided therethrough a number of apertures or slits 13A, which are located along the periphery of the disc 13 with the equal distance between adjacent ones, a light source such as lamp 14 fixed on one side of the disc 13 in opposing to the slits 13A, and a photo-electric conversion element 15 fixed on the other side of the disc 13 to receive the light from the light source 14 passed through the slits 13A of the disc 13. Thus, an electric signal corresponding to the tape speed can be developed from the photo-electric conversion element 15.

Figure 4:
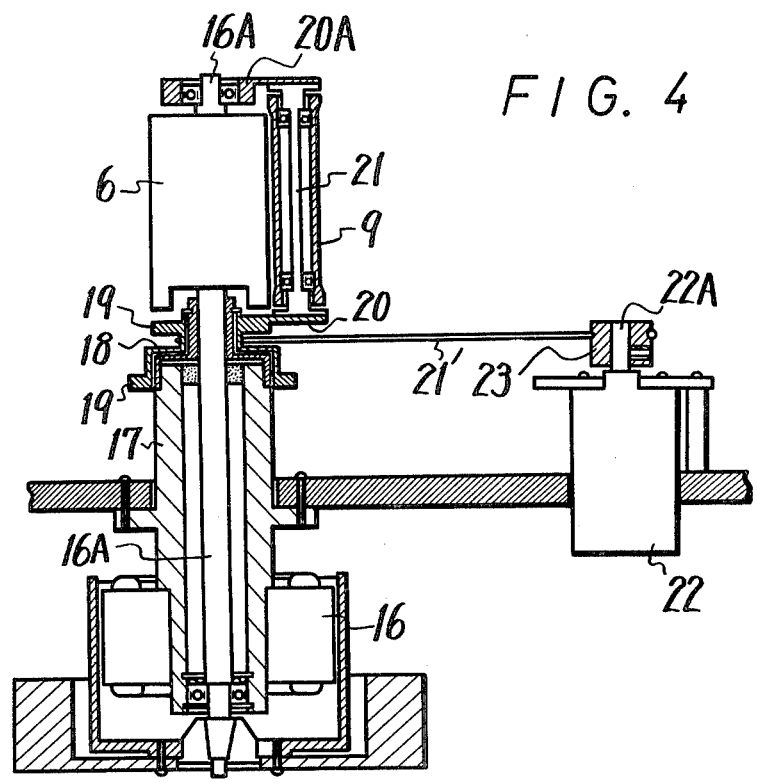
FIG. 4 is a cross-sectional view showing an example of a tape shift post and drive mechanism therefor.
Figure 5:
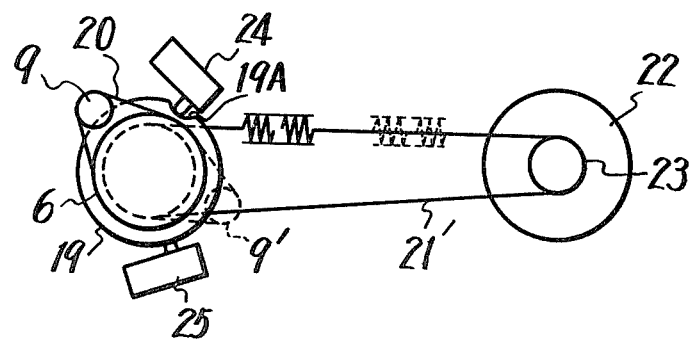
FIG. 5 is a plan view of the tape shift post and drive mechanism shown in FIG. 4.

It is also preferred that, in order to avoid any abrasion of the tape 2 and capstan 6 caused by the speed difference therebetween upon the mode change from the recording or reproducing mode to the fast forward or stop mode, after the tape shift post 9 is moved to its location 9', the reel motors 10 and 11 are increased in speed or stopped. To this end, with the present invention such devices as shown in FIGS. 4 and 5 are provided. That is, a flange 19 is rotatably supported by an upper end portion 18 of a sleeve 17 extended from the housing of a capstan motor 16 whose rotating shaft 16A is attached to the capstan 6, a shaft 21 is seamed on a tape shift arm 20 extended from the flange 19, and the tape shift post 9 is rotatably supported by the shaft 21. The upper end of the shaft 21 and the upper end of the rotating shaft 16A, which passes through the capstan 6 and is extended thereabove, are coupled by an arm 20A similar to the coupling by the arm 20. In this example, a motor 22 is further provided. Between the flange 19 and a pulley 23 fixed to a rotating shaft 22A of the motor 22 there is stretched a belt 21' such as a metal wire or string to rotate the flange 19 by a predetermined amount and accordingly to move the tape shift post 9 in a predetermined arc around the rotating shaft 16A to bring the same position 9' (see FIGS. 2 and 5). At this time, a recess 19A, which is provided at a predetermined position on the outer periphery of the flange 19, engages with the projection of a recording position or stop position sensing switch 24 or 25, which is located at a predetermined position, to operate the switch 24 or 25. Thus, the rotation of the motor 22 is stopped. As a result, the tape shift post 9 is held at the position 9' shown in FIGS. 2 and 5 by the dotted line and hence the tape 2 separates from the capstan 6 to avoid any abrasion of the tape 2 and capstan 6.

Figure 6:
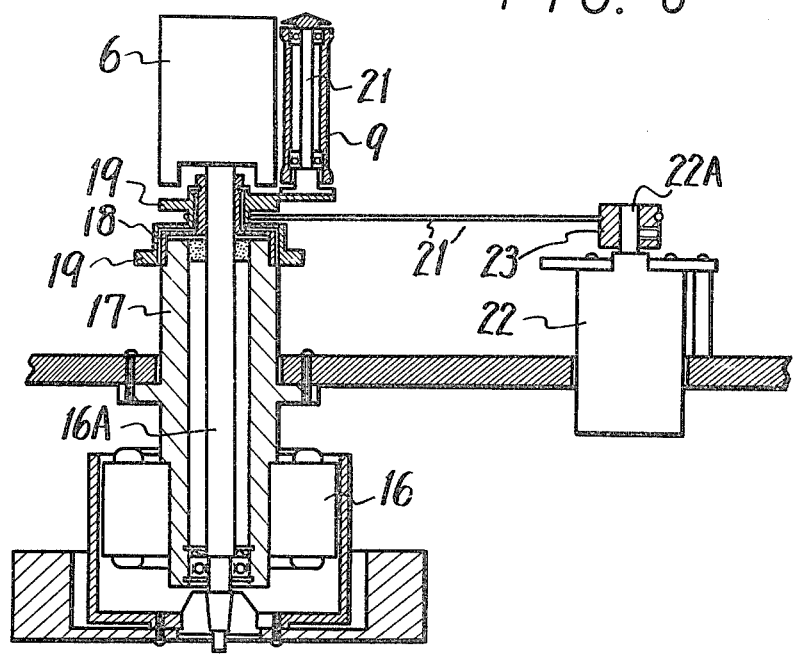
FIG. 6 is a cross-sectional view showing another example of the tape shift post and drive mechanism therefor.

FIG. 6 is a cross-sectional view, similar to FIG. 4, showing another example of the present invention. The example shown in FIG. 4 is suitable for use with a tape with a relatively wide width such as 1 to 2 inches, but for a tape whose width is relatively narrow, the example shown in FIG. 6 is sufficient. In the example shown in FIG. 6, the shaft 21 for the tape shift post 9 is supported at its one end (i.e. lower end in the illustrated example) by the tape shift arm 20 like a cantilever.

In the above examples of the present invention, the tape shift arm 20 is rotatably supported by the rotating shaft 16A of the capstan motor 16 or capstan 6, but it is of course possible that the tape shift arm 20 can be supported independently from the shaft 16A or movably supported by, for example, a base plate of a data recorder.

In the above examples, the electric signal derived from the photo-electric conversion element 15 of the tape speed detecting device 12 is applied to the motor 22 to control the position of the tape shift post 9 automatically, but it is possible that the position of the tape shift post 9 can be controlled manually.

Figure 7:
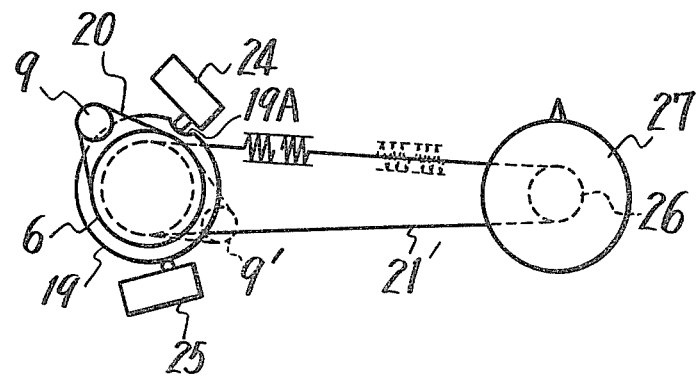
FIG. 7 is a plan view showing a further example of the tape shift post and drive mechanism therefor.

FIG. 7 shows a further example of the invention, which controls the tape shift post 9 manually. In this example, the belt 21' is stretched between the flange 19 and a shaft 26 of a knob 27 in place of the pulley 23 attached to the rotating shaft 22A of the motor 22. Thus, the flange 19 and hence shaft 21 are rotated by rotating the knob 27. The other construction of the example shown in FIG. 7 is substantially same as that of the examples shown in FIGS. 4 to 6.

In the examples shown in FIGS. 4 to 6, the flange 19 and so on are driven by the motor 22, but it will be apparent that they can be driven by a well-known drive devices such as a pulse motor, step motor and so on.

As described in foregoing, in the present invention, the tape shift device or post is newly provided so that, where the tape is driven by the friction between the capstan and tape without using the pinch roller, mechanical impedance of the capstan system can be increased to maintain the wow and flutter value good, and so that the acceleration characteristics, upon charge of the operation mode can be improved remarkably.

The present invention is not to be limited to the preferred embodiments described above or with reference to the drawing, but it will be apparent that many modifications and variations could be effected by one skilled in the art without departing from the spirit or scope of the novel concepts of the invention, as set forth in the appended claims.

We claim as our invention:

1. Tape drive apparatus comprising supply and take up reels selectively operable to transport a tape in a normal record and playback mode at a predetermined speed, a fast forward mode and fast rewind mode; a constant speed capstan about which the tape is normally adapted to contact a peripheral sector of at least 90°, and; tape contact control means movable between a first position apart from said capstan and tape to thereby permit the tape to contact said capstan to be frictionally driven during the record and playback mode and a second position interposed between the tape and said capstan to separate the tape from contact with said capstan during the forward mode at other than said predetermined speed; in the rewind mode, and; on cessesion of transport of the tape.

2. The apparatus according to claim 1 wherein said tape contact control means comprising a freely rotatable post mounted to extend parallel to the axis of said capstan on a swingable arm and motor means for swinging said arm in response to the selected mode.

3. The apparatus according to claim 2 wherein said swingable arm is rotatably mounted about the axis of said capstan.

4. The apparatus according to claim 1, 2 or 3 including means for detecting the speed of transport of the tape, said motive means being responsive thereto to swing said tape contact control means into one of said first and second positions.

5. The apparatus according to claim 4 including means responsive to the detection of the speed of transport of the tape to maintain the tape control means in the second position until such time as tape moves at a speed substantially equal to that of said capstan.

6. The apparatus according to claims 4 including means for detecting the position of said tape contact control means and means responsive thereto to selectively vary the operation of said reels and capstan to change the speed of the tape transport.

7. The apparatus according to claim 1 wherein said tape contact control means is coupled to stop operating means when in said second position.

8. The apparatus according to claim 1 wherein said tape contact control means is coupled to high speed operating means in said second position.

9. The apparatus according to claim 1 wherein said capstan is mounted at the end of a rotatable spindle, and said tape contact means comprises an arm having a hub at one end freely journalled about said spindle and extending radially outward therefrom, said post being mounted at the end of said arm to extend parallel to the axis of said capstans to be swingable about the surface of said axis in an arc uniformly spaced therefrom reversible motive means, and means connecting said motor means to the hub of said arm, and means coupling said motor means to tape transport operating and speed detecting means.

* * * * *